(No Model.)
W. R. LITCHFIELD.
Fruit Picker.
No. 229,150. Patented June 22, 1880.
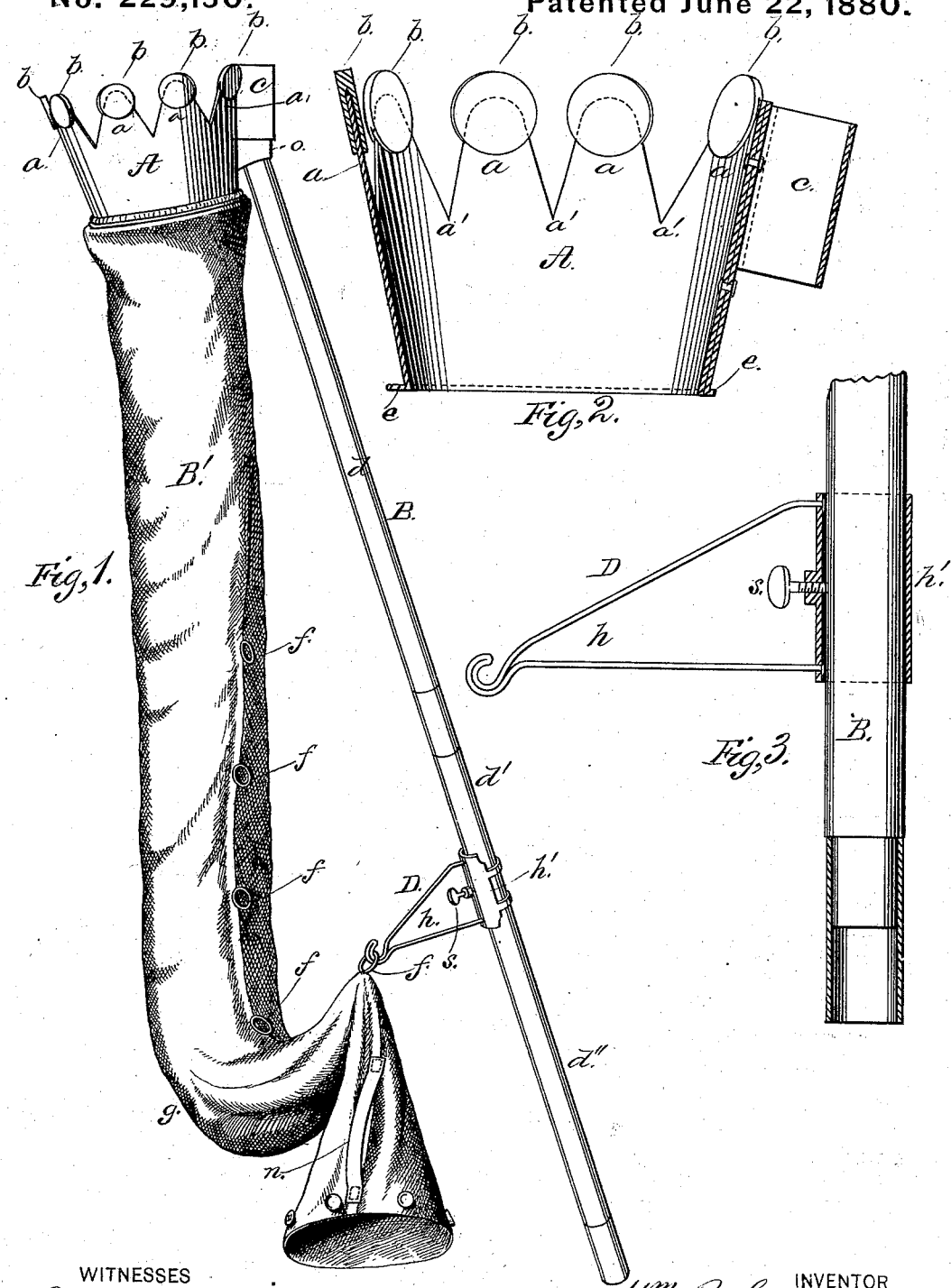

UNITED STATES PATENT OFFICE.

WILLIAM R. LITCHFIELD, OF GOLD HILL, NEVADA.

FRUIT-PICKER.

SPECIFICATION forming part of Letters Patent No. 229,150, dated June 22, 1880.

Application filed April 10, 1880. (No model.)

*To all whom it may concern:*

Be it known that I, WILLIAM R. LITCHFIELD, of Gold Hill, in the county of Storey and State of Nevada, have invented a new and valuable Improvement in Fruit-Pickers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my improved fruit-picker. Fig. 2 is a vertical section of the gathering-ring; and Fig. 3 is a detail view, in section, of the hook-bracket and pole.

This invention has relation to improvements in fruit-pickers; and it consists in the novel arrangement and construction of the devices used, as will be hereinafter more fully set forth.

In the annexed drawings, the letter A designates a sheet-metal ring of the form of a frustum of a cone or crown, and having its upper edge provided with angular projections $a$. Upon the upper ends of these projections or rays are permanently secured the circular rubber disks $b$, the perimeters of which extend out beyond the edges of the projections, and serve to protect the fruit from injury by contact therewith.

The interspaces between the rays $a$ terminate in acute angles $a'$ $a'$, for a purpose hereinafter explained.

Secured to the side of the crown-shaped ring is a socket, $c$, in which is inserted the pole B, by means of which the gatherer is thrust into the tree, the said pole being made up of detachable sections $d$ $d'$ $d''$, socketed together, for the purpose of adjusting its length to the height of the fruit-tree.

The ring A is provided at its lower edge with an annular projecting flange, $e$, over which the open upper end of a flexible tube, B', is passed, and secured by means of a draw-string. This tube may be made of several sections, buttoned or otherwise secured together. It is provided on its side adjacent to the pole with rings $f$, arranged at intervals, and designed for engagement with a hook-ended bracket, D, extending out from the pole, as shown in Fig. 1, for the purpose of causing a bend or loop, $g$, at one or more points of the tube, with a view to checking the descent of the fruit to the ground.

The bracket is composed of a projecting arm, $h$, and a ring, $h'$, through which the pole is passed, and it is adjusted on the said pole by means of a set-screw, $s$, either horizontally or vertically.

In the drawings the gatherer is shown with the bracket in position and as used by a right-handed man; but by loosening the screw the said bracket may be swung around and readjusted to suit a left-handed man.

The step $o$ at the upper end of the pole is oblique to the length of the same, in order that the said tube may hang clear of the pole.

At the lower end of the tube is a strap-handle, $n$, through which one arm is passed for the purpose of enabling the workman to raise the tube, thus enabling him to prevent the fruit from falling to the ground and being bruised, and to deposit the fruit gently in a basket or other receptacle.

In use, the ring A is thrust into the tree and the selected fruit introduced into the same, with its stem projecting through the cutting-angle $a'$, between the projections $a$, when, by a slight upward movement of the pole, it will be detached from the tree and fall through the tube to the ground.

I am aware that fruit-pickers have been made with angular pointed projections re-entering angles between the same and guards, and I do not broadly claim such devices.

What I claim as new, and desire to secure by Letters Patent, is—

The ring A, having the angular projections $a$ at its upper end, the rubber guard-disks $b$, covering the ends of said projections, the inter-angles $a'$, tube B', and pole B, all combined and arranged to form a fruit-gatherer, substantially as specified.

In testimony that I claim the above I have hereunto subscribed my name in the presence of two witnesses.

WILLIAM RILEY LITCHFIELD.

Witnesses:
 J. M. EMERSON,
 S. T. FOX.